United States Patent [19]

Takemori et al.

[11] Patent Number: 5,232,734
[45] Date of Patent: Aug. 3, 1993

[54] HEAT RESISTANT CHOCOLATE AND PRODUCTION METHOD THEREOF

[75] Inventors: Toshio Takemori, Tokyo; Toshinobu Tsurumi, Saitama; Masahiro Takagi, Chiba; Masanori Ito, Saitama, all of Japan

[73] Assignee: Lotte Company Limited, Japan

[21] Appl. No.: 647,056

[22] Filed: Jan. 29, 1991

[30] Foreign Application Priority Data

Feb. 1, 1990 [JP] Japan .................................. 2-20380

[51] Int. Cl.$^5$ .............................................. A23G 1/00
[52] U.S. Cl. .................... 426/610; 426/601; 426/660
[58] Field of Search ............... 426/631, 610, 601, 660

[56] References Cited

U.S. PATENT DOCUMENTS

| 4,446,166 | 5/1984 | Giddey | 426/631 |
| 4,637,937 | 7/1984 | Terada | 426/570 |
| 5,149,560 | 9/1992 | Kealey | 426/631 |

FOREIGN PATENT DOCUMENTS

| 0393327 | 10/1990 | European Pat. Off. | 426/631 |
| 60-27339 | 2/1985 | Japan . | |
| 61-56971 | 12/1986 | Japan . | |
| 62-163658 | 7/1987 | Japan . | |

*Primary Examiner*—Carolyn Paden
*Attorney, Agent, or Firm*—Young & Thompson

[57] ABSTRACT

A heat-resistant chocolate is obtained by adding an O/W type emulsion which is an emulsion of fine particles of oils and fats in water as the continuous phase, to a chocolate, thereby to impart heat resistance to the chocolate while maintaining good taste and a good property of dissolving in the mouth. The O/W type emulsion contains 20–70% water, and is used in an amount from 1 to 10% of the final chocolate.

8 Claims, 1 Drawing Sheet

F I G. 1
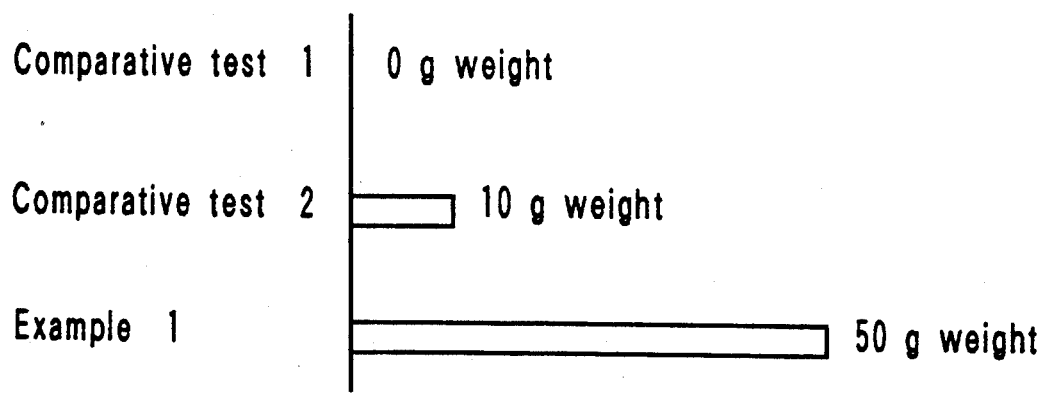

HEAT RESISTANT CHOCOLATE AND PRODUCTION METHOD THEREOF

FIELD OF THE INVENTION

The present invention relates to a chocolate having heat resistance, in particular relates to a heat resistant chocolate and a production method thereof which can be obtained by adding an O/W type emulsion which is an emulsion of water and oils and fats to chocolate and maintains a quality of good taste and good dissolving in the mouth without causing deterioration in quality due to heat.

BACKGROUND OF THE INVENTION

Generally, the chocolate has such a structure in which fine particles such as cacao, milk, and sugars are dispersed in oils and fats. Namely, a general chocolate uses oils and fats which easily dissolve on account of increase in temperature as a dispersing base. Therefore, the chocolate is no heat stable, and as the oils and fats dissolve, deterioration in quality takes place such as sticking to hands, blooming and the like.

In order to improve such properties of the chocolate, many studies have been hitherto done to achieve a heat resistant chocolate.

For example, as a means for giving heat resistance to a chocolate there has been proposed a technique in which a moisture content is added to the chocolate, thereby a framework structure is formed to increase the heat resistance.

The technique for giving heat resistance by adding the moisture content can be classified as follows:
(1) one in which water as such is added,
(2) one in which an emulsion of water and oils and fats (a W/O type emulsion) is added,
(3) one in which a water-containing material (starch gel and the like) is added, and
(4) one in which an emulsion of a water-containing material and oils and fats (a W/O type emulsion) is added.

The above mentioned four kinds of techniques in which the heat resistance lacking in the original chocolate is given by adding the moisture content to the chocolate can be classified into the following two types in accordance with the presence or absence of oils and fats in the additives:
a. one in which a moisture content is directly added, and
b. one in which a W/O type emulsion comprising a water phase portion and an oil phase portion is added.

Among them, in the method in which a moisture content is directly added, it is impossible to homogeneously disperse the moisture content in the chocolate. Therefore, cohesion of water-soluble components is apt to take place due to partial localization of the moisture content to cause a rough feeling in the mouth. In addition, the increase in viscosity is considerable during addition of the moisture content to the chocolate, therefore, when the chocolate of this type is produced, the added amount of the moisture content cannot be made very high.

On the other hand, a method for adding a W/O type emulsion comprising a water phase portion and an oil phase portion is described, for example, in Japanese Laid-open Patent Application No. 57-115140. This producing method is one in which a W/O type emulsion is formed by crystallization of oils and fats, which is mixed with a chocolate in a state of powder or cream to give heat resistance. However, the emulsion according to this method is unstable, and destruction of the emulsion rapidly takes place due to friction heat and the like during mixing with the chocolate, resulting in formation of a local heat resistant framework structure due to the moisture content, so that deterioration in quality such as a scratchy feeling or rough feeling takes place.

SUMMARY OF THE INVENTION

The object of the present invention is to provide a heat resistant chocolate and a production method thereof which can be obtained by using an O/W type emulsion which is an emulsion of water and oils and fats and adding it to a chocolate, and maintains a quality of good taste and good dissolving in the mouth without causing deterioration in quality due to heat.

According to the present invention, there is provided a heat resistant chocolate wherein an O/W type emulsion in which oils and fats are dispersed in a water phase is dispersed and mixed in a chocolate.

Further, according to the present invention, there is provided a method for producing a heat resistant chocolate wherein an O/W type emulsion in which fine emulsified particles comprising oils and fats are dispersed in a water phase which is a continuous phase and a chocolate are dispersed and mixed at a temperature not more than 32° C., which are cooled and molded without heating so as to increase the heat resistance depending on time.

BRIEF DESCRIPTION OF THE DRAWINGS

FIG. 1 is a figure showing the result of the effect on increase in the heat resistance measured by a rheometer with respect to the heat resistance chocolate according to the present invention in which the O/W type emulsion is used, the ordinary plate chocolate, and the heat resistant chocolate according to the conventional technique in which the W/O type emulsion is used.

PREFERRED EMBODIMENT OF THE INVENTION

It is preferable that the water phase is a continuous phase, and oils and fats are fine emulsified particles.

It is preferable that the moisture content of the O/W type emulsion is from 20 to 70%. With respect to the O/W type emulsion, if the moisture content is not more than 20%, it becomes difficult to produce the O/W type emulsion, and it becomes easy to cause phase conversion into the W/O type emulsion. On the other hand, if the moisture content is not less than 70%, the water phase portion becomes too much, resulting in causing increase in viscosity during mixing with the chocolate and it becomes impossible to avoid generating of the rough feeling.

It is preferable that the amount of oils and fats in the O/W type emulsion is from 30% to 80%. If the oils and fats in the O/W type emulsion is not more than 30%, the moisture content to be used of course too much, resulting in causing increase in viscosity during mixing with the and it becomes impossible to avoid generation of the rough feeling, and on the other hand, if the oils and fats are not less than 80%, it becomes difficult to produce the O/W type emulsion, and the phase conversion into the W/O type emulsion is apt to take place. As the oils and fats which may be used can be exemplified, for example, cacao butter and the like.

It is preferable that the added amount of the emulsifier in the O/W type emulsion is from 1 to 20%. If the emulsifier in the O/W type emulsion is not more than 1%, there are problems with the emulsion stability such as cohesion of the emulsified particles and the like. In addition, it is not necessary that the amount of the emulsifier in the O/W type emulsion is less than 20%. The emulsifier which can be used is not especially limited to hydrophobic emulsifiers and hydrophilic emulsifiers, for which, for example can be exemplified soybean phospholipid, lecithin, glycerol fatty acid ester, polyglycerol fatty acid ester, polyglycerol condensed ricinoleic acid ester, sucrose fatty acid ester and the like. It is preferable to use a hydrophobic emulsifier, however, in this case, it is necessary to be dispersed in the oils and fats beforehand due to the hydrophobicity. The phase conversion from the O/W type into the W/O type due to the use of the hydrophobic emulsifier can be avoided by adding a mixture of the oils and fats and the emulsifier to the water phase portion little by little during the production of the emulsion.

It is preferable that the added amount of the O/W type emulsion is from 1 to 10%. If the added amount of the O/W type emulsion is not more than 1%. the added amount of the moisture content is too little, and the effect of increasing the heat resistance is deficient. If the added amount of the O/W type emulsion is more than 10%, the oils and fats to be added become too much, resulting in deterioration in quality of the chocolate.

When the above mentioned O/W type emulsion is added to the chocolate, the temperature of the chocolate is adjusted to be not more than 32° C., the reason of which is to restrain the activity of water in the emulsion. If the temperature of the chocolate becomes to exceeds 32° C. during addition, increase in viscosity of the chocolate takes place due to the moisture content during addition of the emulsion, and production becomes difficult.

The O/W type emulsion to be used for the heat resistant chocolate of the present invention should be one in which the oils and fats are finely dispersed and emulsified. The particles thereof are preferably from 0.1 to 20 $\mu$. The smaller the particles are, the larger the surface areas of the particles become, which is especially preferable because the water phase portion at the particle surface becomes a thin layer. Namely, when the diameters of the particles of the oils and fats are small, thereby the water layer between the particles becomes a thin layer. During mixing with the chocolate, the moisture content is dispersed homogeneously and finely on account of cutting of the continuous water phase portion of the thin layer, and a rapid increase in viscosity is avoided during mixing, and the rough feeling does not take place. Further, it is realized that a homogeneous heat resistant framework structure is formed owing to the homogeneous dispersion of the water content, whereby the heat resistance is increased, and deterioration in quality dose not takes place such as the scratchy feeling and the rough feeling.

Incidentally, the using ratios of the oils and fats and water in the above mentioned O/W type emulsion are in the above mentioned using ranges respectively.

The present invention is one in which the moisture content which is added is contained in the emulsion, thereby the framework structure of the chocolate is formed, which is different from the conventional techniques and especially is characterized in that an O/W type emulsion is used.

As described above, a method for producing a heat resistant chocolate by adding a W/O type emulsion comprising a water phase portion and an oil phase portion is described, for example, in Japanese Laid-open Patent Application No. 57-115140, however, the emulsion according to this production method if unstable, and destruction of the emulsion rapidly takes place due to friction heat and the like during mixing with the chocolate, resulting in the formation of a local heat resistant framework structure due to the moisture content, with deterioration in quality such as a scratchy feeling or rough feeling.

On the contrary, in the present invention, the an O/W type emulsion is used, wherein the O/W type emulsion is one in which the particles of oils and fats are finely dispersed in the water phase which is the continuous phase, and smaller particles provide a thin layer of the water phase portion which is the continuous phase, and the water phase portion is finely dispersed during mixing with the chocolate, therefore, there is no rapid increase in viscosity of the chocolate during production according to this production method, and also there is no generation of the rough feeling. In addition, the emulsion according to this production method is stable, so that the water phase portion is homogeneously dispersed during mixing with the chocolate, and the homogeneous heat resistant framework structure is formed, resulting in no deterioration in quality. Therefore, a heat resistant chocolate having a good flavor and taste as well as dissolving in the mouth can be obtained.

According to the present invention, there is provided a heat resistant chocolate and a production method thereof which can be obtained by using an O/W type emulsion which is an emulsion of water and oils and fats and adding it to a chocolate, and maintains a quality of good taste and good dissolving in the mouth without causing deterioration in quality due to heat.

The present invention will be further explained by examples in detail hereinafter, however, the present invention is not limited only to the following examples.

EXAMPLE 1

One part of cacao fat was mixed with 0.2 part of lecithin to make an oil phase portion. This was gradually added to one part of a water phase portion, and emulsification was carried out using a homomixer to make an O/W type emulsion. The temperature condition during the emulsification production was controlled so as to make the temperature of the O/W type emulsion to be 30° C. to produce the above mentioned emulsion.

A milk chocolate produced by a usual method was subjected to a tempering operation to be 28° C., and 95 parts of this chocolate was mixed with 5 parts of the above mentioned emulsion. The chocolate after mixing was 30+ C. This was charged in a mold, and demolding was carried out after cooling to pack. This product lost the shape-maintaining property at 31° C. immediately after the production, however it had the shape-maintaining property in environments of 40° C. and 50° C. after 10 days of aging.

EXAMPLE 2

One part of substitute fat for the cacao fat comprising palm fat and shea fat was mixed with 0.2 part of polyglycerol condensed ricinoleic acid ester to make an oil phase portion. This was gradually added to one part of a water phase portion, and emulsification was carried out with a homomixer to make an O/W type emulsion. The temperature condition during the emulsification production was controlled so as to make the temperature of the O/W type emulsion to be 30° C. to produce the above mentioned emulsion.

A dark chocolate produced by a usual method was subjected to a tempering operation to be 28° C., and 96 parts of this chocolate was mixed with 4 parts of the above mentioned emulsion. The chocolate after mixing was 30° C. This was charged in a mold, and demolding was carried out after cooling to pack. This product had the shape-maintaining property in environments of 40° C. and 50° C. after 5 days of aging.

COMPARATIVE TEST 1

An ordinary plate chocolate was produced as follows.

Materials shown below were mixed well, which were subjected to making fine particles by applying to a roller, next, refining (conching) was carried out at 60° C. for 40 hours to make a chocolate. This was tempered and solidified.

| Composition of a milk chocolate | |
| --- | --- |
| Cacao mass | 15 |
| Whole milk powder | 25 |
| Cacao butter | 18 |
| Sugar | 42 |
| Emulsifier (lecithin, soybean phospholipid) | 0.3 |
| Flavoring (natural vanilla flavoring) | 0.1 |
| | 100 |

COMPARATIVE TEST 2

In conformity to the description of the example 1 of the above mentioned Japanese Laid-open Patent Application No. 57-115140, a heat resistant chocolate was produced in which the W/O type emulsion was used according to the conventional technique.

TEST FOR COMPARISON OF THE HEAT RESISTANCE

With respect to the above mentioned chocolates of Example 1, Comparative test 1, and Comparative test 2, using a rheometer, the hardness was measured at the time after warming at 40° C. for one hour as a load in the case of using a needle having a diameter of 1 mm. Incidentally, the thickness of each of the chocolates was 10 mm.

As the result thereof, as shown in FIG. 1, the measured load was 50 g weight in the heat resistant chocolate according to the present invention in which the O/W type emulsion was used (Example 1), whereas those of the ordinary plate chocolate (Comparative test 1) and of the heat resistant chocolate according to the conventional technique in which the W/O type emulsion was used (Comparative test 2) were 0 g weight and 10 g weight, respectively.

We claim:

1. A heat resistant chocolate wherein an O/W type emulsion in which oils and fats are dispersed in a water phase is dispersed and mixed in a chocolate, the moisture content originating from the O/W type emulsion being not more than 7% in the final chocolate, said heat resistant chocolate having a shape-maintaining property at a temperature of at least 40 20 C. after aging.

2. The heat resistant chocolate according to claim 1, wherein the water phase is a continuous phase, and oils and fats are fine emulsified particles.

3. The heat resistant chocolate according to claim 1, wherein the moisture content in the O/W type emulsion is from 20 to 70%.

4. The heat resistant chocolate according to claim 1, wherein the amount of oils and fats in the O/W type emulsion is from 30 to 80%.

5. The heat resistant chocolate according to claim 1, wherein an emulsifier is added in the O/W type emulsion from 1 to 20%.

6. The heat resistant chocolate according to claim 1, wherein the added amount of the O/W type emulsion is from 1 to 10% of the final chocolate.

7. A method for producing a heat resistant chocolate, comprising forming an O/W type emulsion by dispersing fine emulsified particles comprising oils and fats in a water phase which is a continuous phase, and then dispersing and admixing said O/W type emulsion in a chocolate at a temperature not more than 32° C., and cooling and molding the thus-produced chocolate without heating so as to increase heat resistance depending on time, the moisture content originating from the O/W type emulsion being not more than 7% in the final chocolate.

8. A method according to claim 7, in which said O/W type emulsion is formed by gradually adding said oils and fats to said water phase with mixing.

* * * * *